(12) United States Patent
Kim et al.

(10) Patent No.: US 10,503,119 B2
(45) Date of Patent: Dec. 10, 2019

(54) GLOBE DISPLAY DEVICE

(71) Applicant: Samsung Display Co., Ltd., Yongin, Gyeonggi-Do (KR)

(72) Inventors: Hyeong-Woo Kim, Daegu (KR); Jae-Jin Bong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 899 days.

(21) Appl. No.: 14/475,264

(22) Filed: Sep. 2, 2014

(65) Prior Publication Data

US 2015/0286185 A1   Oct. 8, 2015

(30) Foreign Application Priority Data

Apr. 8, 2014 (KR) .......... 10-2014-0041721

(51) Int. Cl.
*G03H 1/08* (2006.01)
*G03H 1/22* (2006.01)
*G03H 1/00* (2006.01)

(52) U.S. Cl.
CPC ......... *G03H 1/2294* (2013.01); *G03H 1/0005* (2013.01); *G03H 1/2249* (2013.01); *G03H 1/2205* (2013.01); *G03H 2001/0061* (2013.01); *G03H 2227/03* (2013.01); *G03H 2270/21* (2013.01)

(58) Field of Classification Search
CPC .. G03H 1/2294; G03H 1/0005; G03H 1/2249; G03H 1/2205; G03H 2001/0061; G03H 2227/03; G03H 2270/21
USPC ..................... 359/9; 345/4–5, 156
See application file for complete search history.

(56) References Cited

U.S. PATENT DOCUMENTS

| | | | | |
|---|---|---|---|---|
| 8,884,883 | B2 * | 11/2014 | Benko | G06F 3/14 345/156 |
| 2005/0017924 | A1 * | 1/2005 | Utt | G09G 3/003 345/32 |
| 2009/0027381 | A1 * | 1/2009 | Lee | H04N 13/0497 345/419 |
| 2009/0184954 | A1 | 7/2009 | Street | |
| 2011/0199286 | A1 * | 8/2011 | Dziama | G09B 27/06 345/82 |
| 2013/0254525 | A1 * | 9/2013 | Johnson | G06F 3/012 713/100 |

FOREIGN PATENT DOCUMENTS

| | | |
|---|---|---|
| KR | 1020030081849 | 10/2003 |
| KR | 1020050013268 | 2/2005 |
| KR | 1020110051759 | 5/2011 |

OTHER PUBLICATIONS

Benko et al (Sphere: Multi-Touch interactions on a Spherical Display, UIST'08, Oct 19, 2008, pp. 77-86).*

* cited by examiner

*Primary Examiner* — Stephone B Allen
*Assistant Examiner* — Jyotsna V Dabbi
(74) *Attorney, Agent, or Firm* — Innovation Counsel LLP

(57) ABSTRACT

A globe display device includes a display unit having a spherical shape, a driving unit in the display unit, the driving unit being configured to drive the display unit, a hologram generating unit in the display unit, the hologram generating unit being configured to display holograms on the display unit, a sensing unit in the display unit, the sensing unit being configured to detect information according to user input, and a control unit configured to control the driving unit and the hologram generating unit using values detected by the sensing unit.

21 Claims, 7 Drawing Sheets

(a)

(b)

GLOBE DISPLAY DEVICE

CROSS-REFERENCE TO RELATED APPLICATION

This application claims priority to and the benefit of Korean Patent Application No. 10-2014-0041721, filed on Apr. 8, 2014, with the Korean Intellectual Property Office, the disclosure of which is incorporated herein in its entirety by reference.

BACKGROUND

1. Field

Embodiments relate to a globe display device capable of effectively providing users with information about all parts of the Earth using holograms and spherical display units.

2. Description of Related Technology

A globe refers to a spherical structure that has geographical information of the Earth on a surface of the globe. The globe has been generally used for various purposes such as geography or geology study, but basically has a fixed image only on its surface.

Recently, further functions have been added to a globe in an effort to increase purposes of the globe. For example, a predetermined button is disposed on a surface of a globe and a user manipulates the button in order to be provided with information (e.g., time information or population information) about a corresponding region through a display device (e.g., a time display device) that is separated from the globe.

The conventional technology, however, provides only information related to simple time calculation or other information pre-stored in a storage device, and thus it is limitedly applied to a globe and is difficult to provide changeable information such as latest geographical information.

Further, the separate display device of the conventional technology is generally configured to display information about only one region. Thus, it is also difficult for a user to obtain information about several regions of the Earth and to compare information regarding respective regions.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY

Aspects of embodiments are directed toward a globe display device in which information of all parts of the Earth is updated and geographical information is holographically displayed.

According to an embodiment, a globe display device includes a display unit having a spherical shape; a driving unit disposed in the display unit and configured to drive the display unit; a hologram generating unit disposed in the display unit and configured to display holograms on the display unit; a sensing unit disposed in the display unit and configured to detect information according to user input; and a control unit configured to control the driving unit and the hologram generating unit using values detected by the sensing unit.

The display unit may include a flexible substrate; a driver circuit on the flexible substrate; a display element unit on the driver circuit; and a thin film encapsulation layer on the display element unit.

The driving unit may include a communication module.

The hologram generating unit may include a light source configured to generate and emit a reference beam; a first polarization member configured to polarize the reference beam emitted from the light source at a first polarization angle to generate a polarized reference beam; a spatial light modulation unit configured to realize a holographic interference pattern corresponding to holographic interference pattern data supplied from an outside, and reconstruct and play back a three-dimensional image (holographic image) utilizing diffracted components of the holographic interference pattern, which are generated according to diffraction of the polarized reference beam passing through the holographic interference pattern; and a second polarization member configured to polarize the diffracted components of the holographic interference pattern emitted from the spatial light modulation unit at a second polarization angle so as to remove a zero-order diffracted component from the diffracted components of the holographic interference pattern.

The globe display device may further include an optical member configured such that the reference beam emitted from the light source is adjusted to be uniformly irradiated onto the total effective area of the spatial light modulation unit.

The spatial light modulation unit may include a transmissive liquid crystal display panel including a liquid crystal layer disposed between an upper substrate and a lower substrate.

The first polarization member may be disposed between the light source and the optical member or between the optical member and the spatial light modulation unit.

The spatial light modulation unit may include a reflective liquid crystal display panel including a liquid crystal layer disposed between an upper substrate and a lower substrate, or a liquid crystal on silicon (LCOS) display panel.

The control unit may control a map image displayed on the display unit to be inclined at an angle of 23.44 degrees from a direction perpendicular to a land surface by utilizing tilt information detected by the sensing unit.

The display unit may further include a touch panel.

The control unit may increase or decrease a map image displayed on the display unit by using a location signal received by the touch panel.

The globe display device may further include a guide axis in the display unit.

The display unit may be rotatable about the guide axis.

The globe display device may further include a battery disposed in the guide axis and configured to supply power to the display unit, the driving unit, the hologram generating unit, and the sensing unit.

The globe display device may further include a charger which is configured to charge the battery and on which the display unit is seated.

The display unit may include any one of an organic light emitting diode, a liquid crystal display, and an electrophoretic display.

According to embodiments, a globe display device may update geographical information of all parts of the Earth and display holographic images of the geographical information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and other enhancements of the inventive concept will be more clearly understood from the following detailed description when taken in conjunction with the accompanying drawings, in which.

DETAILED DESCRIPTION

Figure 1:
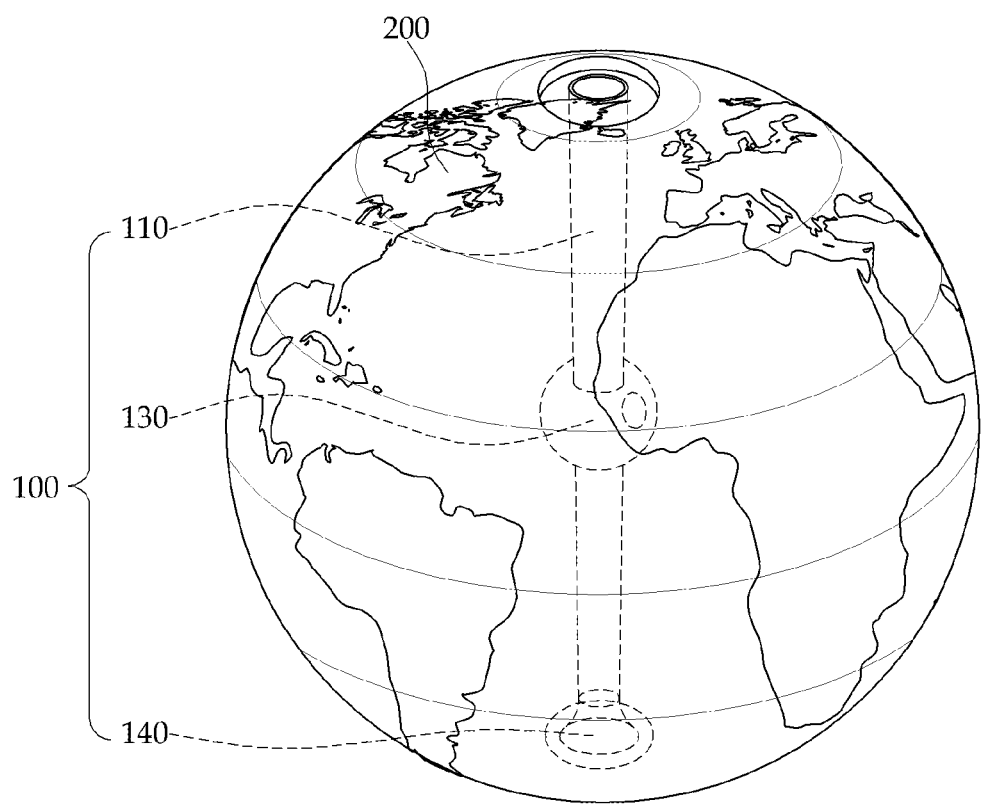
FIG. 1 is a schematic perspective view illustrating a globe display device according to one embodiment.

Embodiments will now be described in detail with reference to the accompanying drawings. The inventive concept may, however, be embodied in many different forms and should not be construed as being limited to the embodiments set forth herein. Rather, these embodiments are provided for thoroughness and completeness of the disclosure, and will fully convey the scope of the inventive concept to those skilled in the art.

In the drawings, certain elements or shapes may be simplified or exaggerated to better illustrate embodiments, and other elements present in an actual product or other embodiments may also be omitted. Thus, the drawings are intended to facilitate the understanding of the inventive concept. Like reference numerals refer to like elements throughout the specification.

In addition, when a layer or element is referred to as being "on" another layer or element, the layer or element may be directly on the other layer or element, or one or more intervening layers or elements may be interposed between. Further, the use of "may" when describing embodiments refers to "one or more embodiments."

Hereinafter, a globe display device according to one embodiment will be described with reference to FIGS. 1 to 5.

Figure 2:
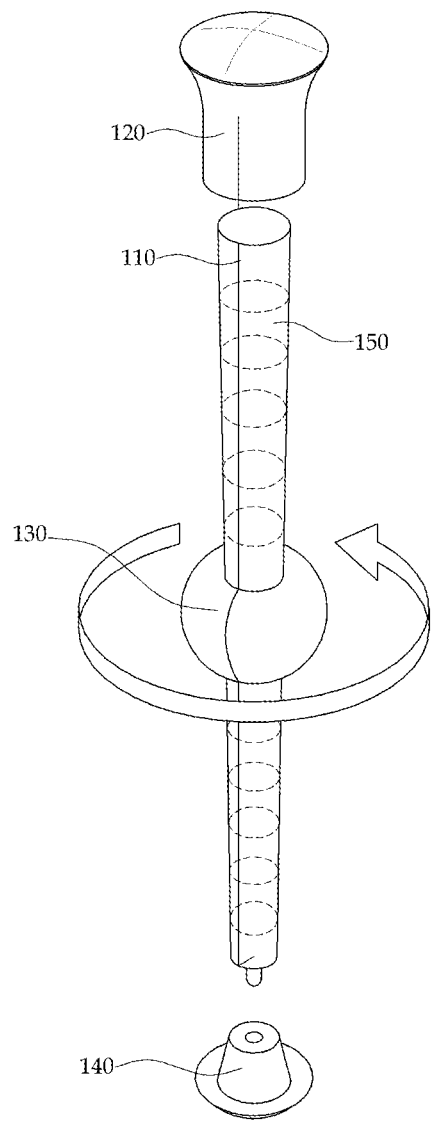
FIG. 2 is a schematic perspective view illustrating a guide portion illustrated in FIG. 1.
Figure 3:
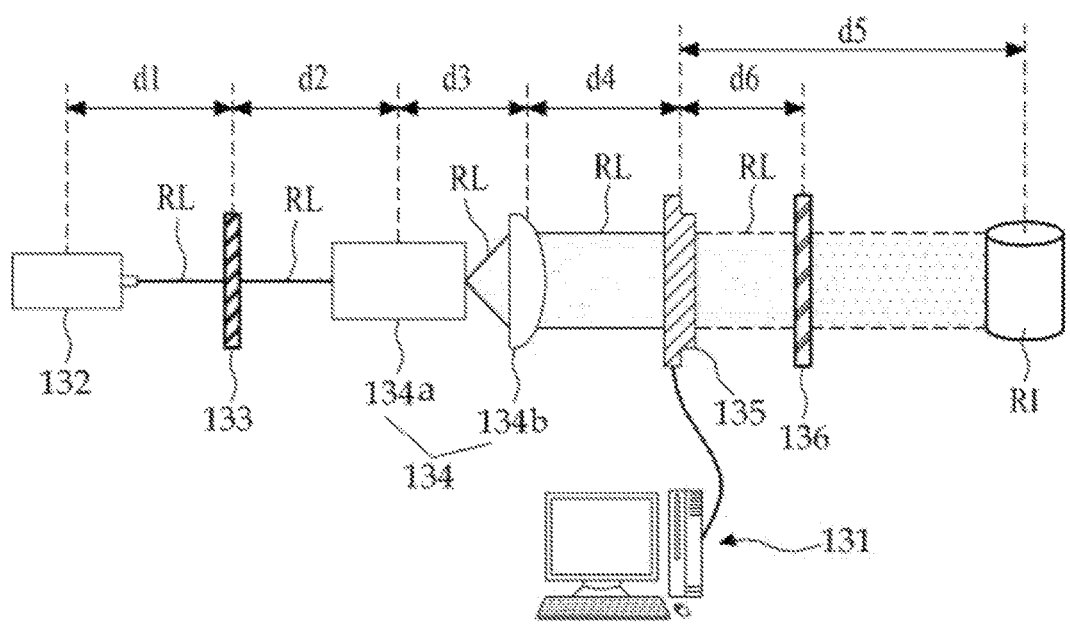
FIG. 3 is a schematic diagram illustrating a hologram generating unit.

FIG. 1 is a schematic perspective view illustrating a globe display device according to one embodiment. FIG. 2 is a schematic perspective view illustrating a guide portion illustrated in FIG. 1. FIG. 3 is a schematic diagram illustrating a hologram generating unit.

Referring to FIGS. 1 to 3, a globe display device 10 according to one embodiment includes a display unit 200 and a guide portion 100.

The display unit 200 may be spherical in shape and may be configured to provide a user with predetermined information about all parts (e.g., the surface, the ground, the atmosphere, etc.) of the Earth.

In detail, the display unit 200 may include a plurality of display areas that are disposed to be spherical in shape. Each display area may display information about a part of the Earth, which corresponds to the display area. One display area of the display unit 200 may correspond to, for example, a Korean region on the entire Earth.

Regarding the technique for forming the display unit 200 to have a spherical shape, reference will be made to U.S. Patent Application Publication No. 2009-0184954, published on Jul. 23, 2009, which is hereby incorporated by reference in its entirety.

Meanwhile, elements included in the display unit 200 may be transparent display elements. That is, each element may be made of a transparent material.

For instance, the display unit 200 may be a transparent organic light emitting display. The transparent organic light emitting display may refer to a transparent display device utilizing an organic light emitting diode (OLED) that is self-emissive. Since an organic light emitting layer is transparent, the anode and cathode are used as transparent electrodes, so that a transparent display device can be realized. An organic light emitting display emits light when a hole and an electron are injected into an organic light emitting layer and combined with each other in the organic light emitting layer. Such a principle is also applied to the transparent organic light emitting display, and thus a hole and an electron are injected into a desired place such that information is displayed.

According to one embodiment, each display area may include a flexible display element. The flexible display element may be made of materials with high flexibility so as to be foldable or rollable. In the case where each display area includes the flexible display element, the display unit 200 may be more smoothly realized as having a spherical shape.

In one embodiment, the display unit 200 may include a flexible substrate, a driver circuit on the flexible substrate, a display element unit on the driver circuit, and a thin film encapsulation layer on the display element unit.

The flexible substrate may be made of a flexible material. For example, the flexible substrate may be made of plastic. In one embodiment, the flexible substrate may be made of any one material of Kapton®, polyethersulphone (PES), polycarbonate (PC), polyimide (PI), polyethyleneterephthalate (PET), polyethylenenaphthalate (PEN), polyacrylate (PAR), and fiber reinforced plastic (FRP). Among these, polyimide (PI) is an especially suitable material for the flexible substrate which will undergo thermal processes because polyimide is excellent in thermal resistance.

The flexible substrate may have a thickness of about 5 μm to about 200 μm. In the case where the thickness of the flexible substrate is less than 5 μm, the flexible substrate is difficult to stably support the display element unit. On the other hand, in the case where the thickness of the flexible substrate is 200 μm or greater, the flexible substrate has poor flexibility. Further, the flexible substrate may have a coefficient of thermal expansion (CTE) of about 3 ppm/° C. to about 10 ppm/° C.

The driver circuit may be configured to apply driving voltages or various driving signals to the display element unit and may be a thin film transistor (TFT) layer, for example.

The display element unit may be any one of an organic light emitting diode (OLED), a liquid crystal display (LCD), and an electrophoretic display (EPD).

The thin film encapsulation layer may include one or more inorganic layers and one or more organic layers. The thin film encapsulation layer may have a laminated structure in which the inorganic layers and the organic layers are alternately laminated. In this case, the inorganic layer is the lowermost layer. That is, the inorganic layer is disposed to be the closest to the display element unit. The thin film encapsulation layer may have a thickness of about 10 μm or less.

Meanwhile, the display unit 200 may further include a touch panel. The touch panel may be disposed on the thin film encapsulation layer and may include a touch sensor. The touch panel senses touch performed by, for example, a pen and/or a user's finger utilizing the touch sensor and transmits a location signal corresponding to where the touch is performed to a driving unit 120. The touch panel may be used as an input to the globe display device 10 and may be resistive or capacitive.

Referring to FIG. 2, the guide portion 100 may include a guide axis 110, a driving unit 120, a hologram generating unit 130, a sensing unit 140, a battery 150, and a control unit.

The guide axis 110 may be coupled to the driving unit 120, the hologram generating unit 130, and the sensing unit 140 and may serve to support each element. The guide axis 110 may include the battery 150 and may be coupled to an external charger to charge the battery 150.

The guide axis 110 may further include a rotating unit (not shown) that allows the display unit 200 to be rotatable. The rotating unit may be operated in accordance with user's rotation manipulation so as to rotate the display unit 200. In some cases, the rotating unit may be operated so as to allow the display unit 200 to rotate automatically. In order to configure the rotating unit, various known configuration principles may be employed.

A plurality of batteries 150 may be disposed in the guide axis 110 and may supply power to the display unit 200, the driving unit 120, the hologram generating unit 130, and the sensing unit 140.

The driving unit 120 may be disposed in the display unit 200 and may be configured to drive the display unit 200.

The driving unit 120 may include a communication module. The communication module may be configured to receive information about a predetermined region on Earth, which corresponds to one or more display area of the display unit 200, from an external device. The communication module may receive geographical information of the Earth in real time. The external device may be, for example, a satellite. The satellite may convert information about all parts of the Earth into digital signals while orbiting the Earth so as to transmit the digital signals to the communication module. The digital signals transmitted to the communication module may be analyzed in the control unit, may be converted into a form suitable to be displayed on the display unit 200 through the driving unit 120, and may be displayed in a display area of the display unit 200.

Information received by the communication module may include one or more of geographical, meteorological, and traffic information regarding a predetermined region on Earth. The geographical information may include, for example, shapes or dispositions of sea, mountain, river, road, bridge, and the like of a predetermined region of the earth. Examples of the meteorological information may include temperature, air pressure, wind, clouds, rain, snow, fog, and the like of a predetermined region of the earth.

Examples of the traffic information may include traffic congestion on roads or at sea of a predetermined region of the earth. The geographical, meteorological, and traffic information may be displayed with diverse images according to what the information contains in a display area of the display unit 200. Such images may be real pictures or may be converted copies of satellite photographs. The images may also be abstract images of information (e.g., road, bridge, clouds, rain, transportation, etc.). The images may be provided together with a predetermined string.

The hologram generating unit 130 may be disposed in the display unit 200 and may display holograms on the display unit 200. In one embodiment, the hologram generating unit 130 may be disposed in a central portion of the display unit 200.

Referring to FIG. 3, the hologram generating unit 130 utilizing computer generated holography may include a pattern generating unit 131, a light source 132, a first polarization member 133, an optical member 134, a lens 134b, a spatial light modulation unit 135, and a second polarization member 136.

The pattern generating unit 131 may perform computational calculation of an interference pattern between a reference beam and an object beam, may generate holographic interference pattern data corresponding to a holographic image, and may provide the spatial light modulation unit 135 with the holographic interference pattern data.

The light source 132 may be disposed at the back of the spatial light modulation unit 135 and may emit a reference beam RL onto the spatial light modulation unit 135.

In this case, the reference beam RL has desirably straight and parallel characteristics. In this regard, the light source 132 may be lasers or collimated light emitting diodes (LEDs). In the case where a laser is used as the light source 132, the reference beam RL may have a wavelength of about 630 nm.

The first polarization member 133 may be disposed on the front surface of the light source 132 so as to be spaced apart from the light source 132 by a first predetermined distance d1. For example, the first distance d1 between the light source 132 and the first polarization member 133 may be about 100 mm. The first polarization member 133 polarizes a reference beam RL incident from the light source 132 at a first predetermined polarization angle. In one embodiment, the first polarization member 133 may be a polarization film that has a polarization angle in a range of 6 degrees to 96 degrees, a degree of polarization of 99% or more, and a transmittance in a range of 30% to 40%.

The reference beam RL emitted from the light source 132 may have a predetermined degree of polarization, and thus the reference beam RL passing through the first polarization member 133 may have different intensities according to polarization axes of the first polarization member 133. In experiments with varying polarization angles of the first polarization member 133, it can be ascertained that the reference beam RL passing through the first polarization member 133 has the lowest intensity when the polarization angle of the first polarization member 133 is 6 degrees, and the reference beam RL passing through the first polarization member 133 has the highest intensity when the polarization angle of the first polarization member 133 is 96 degrees. Therefore, it is desirable for the first polarization member 133 to have a polarization angle in a range of 6 degrees to 96 degrees.

The optical member 134 may diffuse and collect the reference beam RL that is incident while being polarized by the first polarization member 133 in a predetermined polarization direction, and may emit the reference beam RL uniformly onto the total effective area of the spatial light modulation unit 135. To achieve this, the optical member 134 may include a light diffusion unit 134a and the lens 134b.

The light diffusion unit 134a may be disposed on the front surface of the first polarization member 133 so as to be spaced apart from the first polarization member 133 by a second predetermined distance d2. For example, the second distance d2 between the light diffusion unit 134a and the first polarization member 133 may be about 100 mm. The light diffusion unit 134a may increase a cross-sectional area of the reference beam RL that is incident while being polarized by the first polarization member 133 in a predetermined polarization direction.

The lens 134b may be disposed on the front surface of the light diffusion unit 134a so as to be spaced apart from the light diffusion unit 134a by a third predetermined distance d3. For example, the third distance d3 between the light diffusion unit 134a and the lens 134b may be about 75 mm. In this case, the lens 134b may have a focal length of about 75 mm. The lens 134b may adjust the size of the reference beam RL increased by the light diffusion unit 134a so that the reference beam RL is irradiated to the total effective area of the spatial light modulation unit 135 in a uniform manner.

The reference beam RL emitted from the light source 132 is polarized while being transmitted through the first polarization member 133 and the polarized reference beam RL is increased by the light diffusion unit 134a, and thereafter it is uniformly irradiated to the total effective area of the spatial light modulation unit 135 by the lens 134b.

The spatial light modulation unit 135 may include a transmissive liquid crystal display panel including a liquid crystal layer disposed between an upper substrate and a lower substrate. The spatial light modulation unit 135 may be disposed on the front surface of the lens 134b so as to be spaced apart from the lens 134b by a fourth predetermined distance d4. For example, the fourth distance d4 between the spatial light modulation unit 135 and the lens 134b may be about 280 mm.

The spatial light modulation unit 135 may display a holographic interference pattern corresponding to holographic interference pattern data supplied from the pattern generating unit 131, and thus it may reconstruct a holographic image RI through diffracted components of the holographic interference pattern generated by the reference beam RL diffracted by the holographic interference pattern.

The holographic image RI reconstructed by the spatial light modulation unit 135 may be played back on a screen or in the air that is spaced apart from the spatial light modulation unit 135 by a fifth predetermined distance d5. In one embodiment, the screen may act as the display unit 200. The fifth distance d5 between the screen (or the air) and the spatial light modulation unit 135 may be about 1132 mm. Therefore, when the holographic image RI is played back in the air, the display unit 200 may be spaced 1132 mm or less apart from the hologram generating unit 130.

When the holographic image RI is reconstructed as described above, the diffracted components of the holographic interference pattern generated in the spatial light modulation unit 135 may include $n^{th}$ diffracted components that are diffracted, and zero-order diffracted components (DC components) that are not diffracted and are directly transmitted. Among the diffracted components of the holographic interference pattern, the zero-order diffracted components overlap the reconstructed holographic image RI such that the holographic image RI has poor image quality.

The second polarization member 136 may be disposed on the front surface of the spatial light modulation unit 135 so as to be spaced apart from the spatial light modulation unit 135 by a sixth predetermined distance d6. For example, the sixth distance d6 between the spatial light modulation unit 135 and the second polarization member 136 may be about 132 mm. The second polarization member 136 may transmit only the $n^{th}$ diffracted components except for the zero-order diffracted components. This removes the zero-order diffracted components from the diffracted components of the holographic interference pattern generated in the spatial light modulation unit 135, thereby enhancing image sharpness of the reconstructed holographic image RI.

In detail, the $n^{th}$ diffracted components and the zero-order diffracted components of the holographic interference pattern generated in the spatial light modulation unit 135 may have changed polarization properties, respectively, by passing through the spatial light modulation unit 135. Accordingly, the second polarization member 136 may polarize the holographic image RI emitted from the spatial light modulation unit 135 at a second predetermined polarization angle based on the respective polarization properties of the $n^{th}$ diffracted components and the zero-order diffracted components, and may remove only zero-order diffracted components from diffracted components of the holographic image RI, thereby enhancing image sharpness of the reconstructed holographic image RI. In this case, a removal ratio of the zero-order diffracted component may vary depending on the difference in polarization angles between the first and second polarization members 133 and 136. In other words, an experiment is conducted to measure a polarization angle of the second polarization member 136 at which the zero-order diffracted components are removed the most or a polarization angle of the second polarization member 136 at which the minimum intensity of the zero-order diffracted components occurs while the polarization angle of the first polarization member 133 changes. As a result, it is desirable to set the polarization angle of the second polarization member 136 to have a difference in a range of 26 degrees to 70 degrees from the polarization angle of the first polarization member 133. In this case, the second polarization member 136 may be a polarization film that has a degree of polarization of 99% or more and a transmittance in a range of 30% to 40%.

According to the experiment, the polarization angle difference between the first and second polarization members 133 and 136 at which the zero-order diffracted components are removed the most may be about 30 degrees on average, and also it can be ascertained that when the polarization angle of the first polarization member 133 is 6 degrees or less, the holographic image RI may not be reconstructed.

The sensing unit 140 may be disposed in the display unit 200 and may be configured to detect touch information according to user input and tilt information of a map image displayed on the display unit 200. The touch information may include a location signal, or the like.

For instance, the sensing unit 140 may include a touch sensor, an angular velocity sensor, and a tilt sensor.

The touch sensor may detect a touch performed on the display unit 200 by a user's finger, or the like and may transmit a location signal corresponding to where the touch occurs to the control unit. In one embodiment, the sensing unit 140 may not be provided with the touch sensor, and may receive a location signal sensed by the touch panel and may transmit the location signal to the control unit.

The angular velocity sensor may detect a motion that allows the globe display device 10 to rotate in order to turn on or off the globe display device 10 and may transmit angular velocity information to the control unit.

The tilt sensor may include a two-axis acceleration sensor and an A/D converter configured to convert analog outputs of the two-axis acceleration sensor into digital signals.

In more detail, the tilt sensor may include an X-axis acceleration sensor configured to measure acceleration according to a tilt in the direction of the X-axis of the globe display device 10, a Y-axis acceleration sensor configured to measure acceleration according to a tilt in the direction of the Y-axis of the globe display device 10, filters configured to remove noise from outputs of the X-axis and Y-axis acceleration sensors, and the A/D converter configured to convert analog outputs of the X-axis and Y-axis acceleration sensors into digital outputs. Herein, the X-axis refers to a vertical longitudinal axis of the display device and the Y-axis refers to one axis disposed in a plane perpendicular to the X-axis.

The control unit may be configured to control the driving unit 120 and the hologram generating unit 130 using values detected by the sensing unit 140. The control unit may be disposed in the guide axis 110.

The control unit may control the driving unit 120 and the hologram generating unit 130 through signals received by the touch panel. That is, in the case where a user views only a map image of the display unit 200 or a holographic image, the control unit may allow the driving unit 120 or the hologram generating unit 130 to drive for controlling the map image of the display unit 200 and the holographic image, respectively.

The control unit may also increase or decrease a display of a specific display area of the display unit 200 in accordance with location signals received from the sensing unit 140. For example, a touch is performed by a user's finger on a display area in which the user is interested among a plurality of display areas of the display unit 200, and a display of the interested display area may be then increased or decreased.

Further, the control unit may change the globe display device 10 to be in an on-state or off-state utilizing angular velocity information received from the sensing unit 140. For instance, in the case of being in an on-state, the globe display device 10 may rotate for more than a predetermined time, and then it may be turned off. The angular velocity sensor included in the sensing unit 140 may sense angular velocity of the display unit 200, and thereafter the control unit may adjust the globe display device 10 to be tuned on or off when the globe display device 10 rotates for more than a predetermined time. In one embodiment, the predetermined time may be in a range of 5 seconds to 10 seconds.

The control unit may also control an angle of a map image displayed on the display unit 200. The control unit may control the map image displayed on the display unit 200 to be inclined at an angle of 23.44 degrees from the direction perpendicular to the land surface utilizing tilt information sensed by the sensing unit 140.

In more detail, the control unit may further include a memory configured to store tilt values output by utilizing an angular conversion module, an operation switch configured to direct the tilt sensor to operate, and a calculation unit configured to transmit the stored tilt values to the display unit 200 so as to display a map image in response to angular changes of the globe display device 10.

Further, the control unit may be configured such that information received by the communication module may be properly displayed in one or more display areas. For example, the control unit may determine which area among all parts of the Earth is related to the information received by the communication module. To perform the above function, a range of values of longitude and latitude on Earth may be given beforehand regarding each display area. The control unit may be provided with its own memory device so as to perform the above-described functions smoothly and may also be mounted with a microprocessor, and thus the control unit may be a digital device having calculation abilities.

The control unit, the sensing unit 140, the driving unit 120, the display unit 200, and the hologram generating unit 130 will be comprehensively described below with reference to FIGS. 4 and 5.

Figure 4:
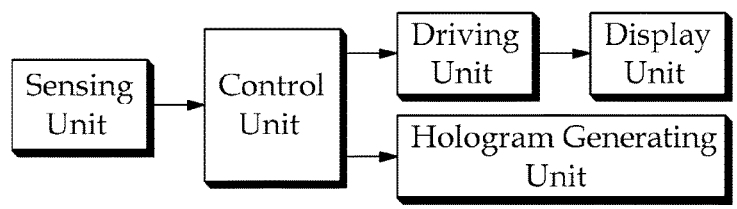
FIG. 4 is a schematic block diagram illustrating control of a globe display device according to one embodiment.

FIG. 4 is a schematic block diagram illustrating control of a globe display device according to one embodiment. FIG. 5 is a flow chart showing steps of the block diagram of FIG. 4.

Figure 5:
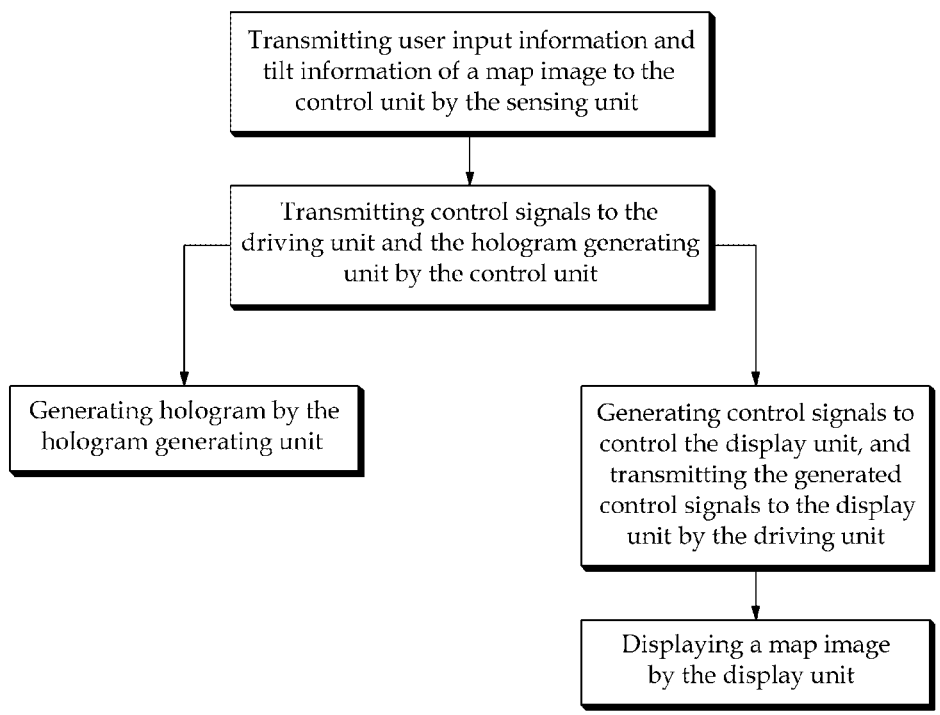
FIG. 5 is a flow chart showing steps of the block diagram of FIG. 4.

Referring to FIGS. 4 and 5, the sensing unit 140 may transmit user input information, tilt information of a map image, and the like to the control unit. The control unit may transmit control signals to the driving unit 120 and the hologram generating unit 130 utilizing values detected by the sensing unit 140. The control unit may allow only one of the driving unit 120 and the hologram generating unit 130 to drive or may allow both of them to drive at the same time. The hologram generating unit 130 may receive the control signals from the control unit and may generate holograms. The driving unit 120 may receive the control signals from the control unit, may generate control signals to control the display unit 200, and may transmit the generated control signals to the display unit 200. The display unit 200 may receive the control signals from the driving unit 120 so as to display a map image.

Hereinafter, various applications of a globe display device according to one embodiment will be described with reference to FIGS. 6 to 10B.

Figure 6:
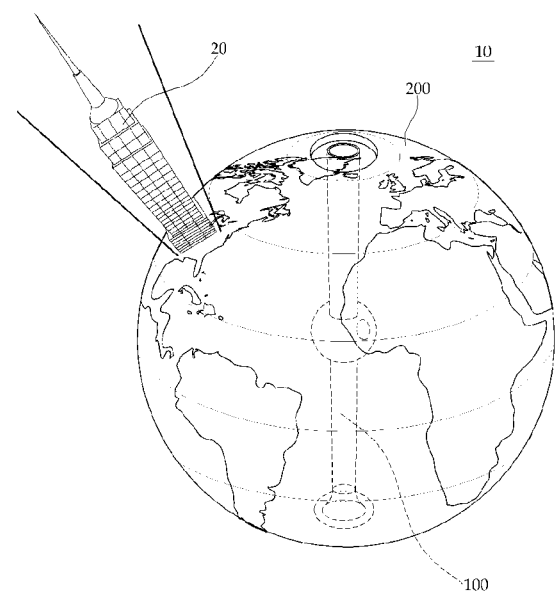
FIG. 6 is a perspective view illustrating a globe display device on which a holographic image is displayed.
Figure 7:
FIG. 7 is a perspective view illustrating a globe display device in which a home screen is displayed by user touch.
Figure 8:
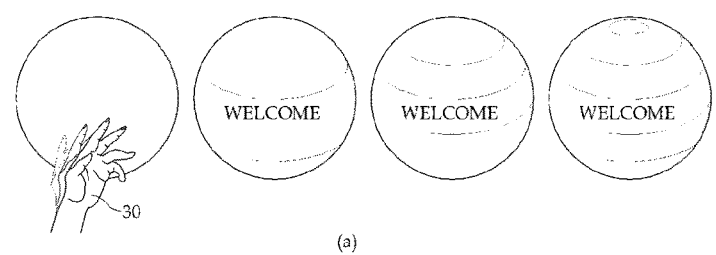
FIG. 8 is a schematic use state diagram illustrating a globe display device turned on or off by rotation.
Figure 8:
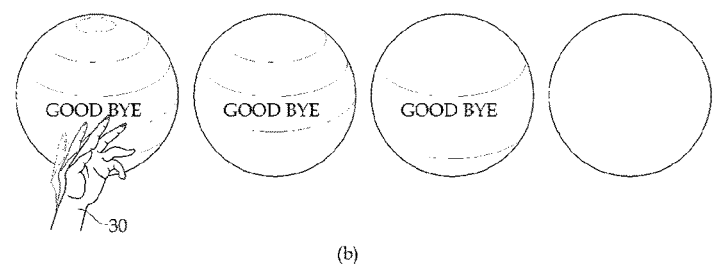
Figure 9:
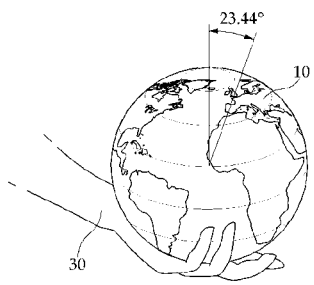
FIG. 9 is a diagram illustrating a state of an image on a display unit, which is maintained at a predetermined angle.
Figure 9:
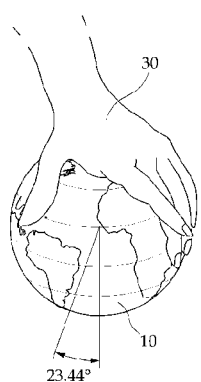
Figure 10A:
FIGS. 10A and 10B are perspective views illustrating a globe display device illustrated in FIG. 1 and a charger thereof.
Figure 10B:
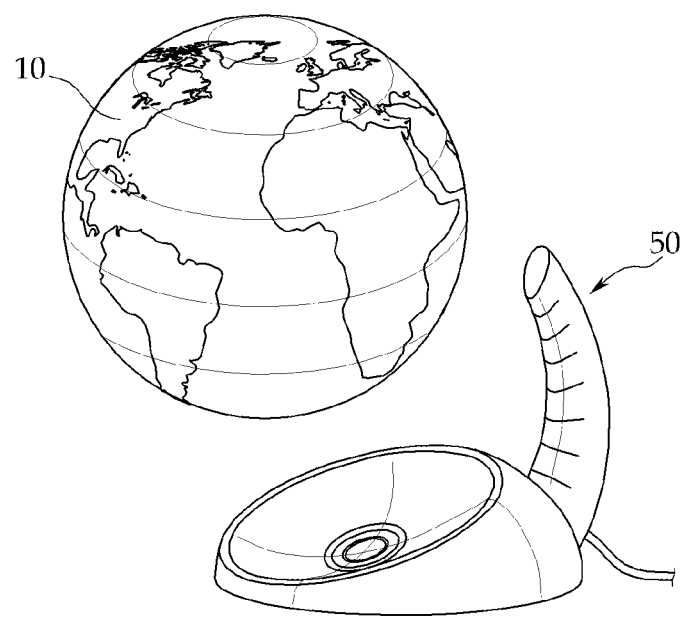

FIG. 6 is a perspective view illustrating a globe display device on which a holographic image is displayed. FIG. 7 is a perspective view illustrating a globe display device in which a home screen is displayed by user touch. FIG. 8 is a schematic use state diagram illustrating a globe display device turned on or off by rotation. FIG. 9 is a diagram illustrating a state of an image on a display unit, which is maintained at a predetermined angle. FIGS. 10A and 10B are perspective views illustrating a globe display device illustrated in FIG. 1 and a charger thereof.

Referring to FIG. 6, a holographic image 20 generated by the hologram generating unit 130 may be displayed on the display unit 200. For instance, the holographic image 20 may be a shape of a building that represents any one region. When the holographic image 20 is displayed above the display unit 200, it may be spaced apart from the display unit 200 by a predetermined distance or may be displayed on the display unit 200 that acts as a screen.

Referring to FIG. 7, a home menu 40 may be displayed on the display unit 200 by a touch performed by a user 30. The home menu 40 may be a smartphone operating system that is generally used. The home menu 40 displayed on the display unit 200 may serve to search for simple geographical information.

Referring to FIG. 8, the globe display device 10 may be tuned on or off by rotating. When the globe display device 10 is in an on-state, it may rotate for more than a predetermined time, and then may be turned off. The angular velocity sensor included in the sensing unit 140 may sense rotating velocity of the spherical display unit 200, and thereafter the globe display device 10 may be tuned on or off when the spherical display unit 200 rotates for more than a predetermined time. In one embodiment, the predetermined time may be in a range of 5 seconds to 10 seconds.

Referring to FIG. 9, the display unit 200 may always display images of the Earth to be inclined at an angle of 23.44 degrees from a normal line perpendicular to the land surface. That is, the displayed images of the Earth may be inclined at an angle of 23.44 degrees from a normal line perpendicular to the land surface regardless of directions in which the globe display device 10 rotates or regardless of places where the globe display device 10 is located.

Referring to FIGS. 10A and 10B, the globe display device 10 may be seated on a charger 50 that is separately fabricated, so as to be charged. The battery 150 disposed in the guide axis 110 may be coupled to a charging terminal of the charger 50. A seating portion of the charger 50 may be formed in consideration of a spherical shape of the globe display device 10. The charger 50 may include a charge display unit 51, a body 52, and a power supply line 53.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:

1. A globe display device comprising:
   a display unit in a shape of a sphere, the display unit generating a map image and displaying the map image;
   a driving unit in the display unit, the driving unit being configured to drive the display unit;
   a hologram generating unit in the display unit, the hologram generating unit being configured to display holograms on the display unit;
   a sensing unit in the display unit, the sensing unit being configured to detect information according to user input; and
   a control unit configured to control the driving unit and the hologram generating unit using values detected by the sensing unit,
   wherein the control unit controls the map image generated by and displayed on the display unit to be inclined at a predetermined angle from a direction perpendicular to a land surface by utilizing tilt information detected by the sensing unit regardless of directions in which the display unit rotates or regardless of places where the display unit is located,
   wherein the land surface is a surface on which the display unit is placed,
   wherein a position of the map image generated by and displayed on the display unit does not change even when the display unit is rotated or relocated to a different place.

2. The globe display device of claim 1, wherein the display unit comprises:
   a flexible substrate;
   a driver circuit on the flexible substrate;
   a display element unit on the driver circuit; and
   a thin film encapsulation layer on the display element unit.

3. The globe display device of claim 1, wherein the driving unit comprises a communication module.

4. The globe display device of claim 1, wherein the hologram generating unit comprises:
   a light source configured to generate and emit a reference beam;
   a first polarization member configured to polarize the reference beam emitted from the light source at a first polarization angle to generate a polarized reference beam;
   a spatial light modulation unit configured to realize a holographic interference pattern corresponding to holographic interference pattern data supplied from an outside, and reconstruct and play back a three-dimensional image utilizing diffracted components of the holographic interference pattern, which are generated according to diffraction of the polarized reference beam passing through the holographic interference pattern; and
   a second polarization member configured to polarize the diffracted components of the holographic interference pattern emitted from the spatial light modulation unit at a second polarization angle so as to remove a zero-order diffracted component from the diffracted components of the holographic interference pattern.

5. The globe display device of claim 4, further comprising an optical member configured such that the reference beam emitted from the light source is adjusted to be uniformly irradiated onto the total effective area of the spatial light modulation unit.

6. The globe display device of claim 5, wherein the spatial light modulation unit comprises a transmissive liquid crystal display panel comprising a liquid crystal layer disposed between an upper substrate and a lower substrate.

7. The globe display device of claim 6, wherein the first polarization member is disposed between the light source and the optical member or between the optical member and the spatial light modulation unit.

8. The globe display device of claim 5, wherein the spatial light modulation unit comprises a reflective liquid crystal display panel comprising a liquid crystal layer disposed between an upper substrate and a lower substrate, or a liquid crystal on silicon (LCOS) display panel.

9. The globe display device of claim 1, wherein the predetermined angle is 23.44 degrees.

10. The globe display device of claim 1, wherein the display unit further comprises a touch panel.

11. The globe display device of claim 10, wherein the control unit increases or decreases a map image displayed on the display unit by using a location signal received by the touch panel.

12. The globe display device of claim 1, further comprising a guide axis in the display unit.

13. The globe display device of claim 12, wherein the display unit is rotatable about the guide axis.

14. The globe display device of claim 12, further comprising a battery in the guide axis, the battery being configured to supply power to the display unit, the driving unit, the hologram generating unit, and the sensing unit.

15. The globe display device of claim 14, further comprising a charger configured to charge the battery, the charger on which the display unit is seated.

16. The globe display device of claim 1, wherein the display unit comprises any one of an organic light emitting diode, a liquid crystal display, and an electrophoretic display.

17. The globe display device of claim 1, wherein the hologram generating unit is disposed in a central portion of the display unit.

18. The globe display device of claim 1, the holograms is displayed with being spaced apart from the display unit by a predetermined distance.

19. The globe display device of claim 1, the display unit is spaced 1132 mm or less apart from the hologram generating unit.

20. The globe display device of claim 1, the sensor unit include a two-axis acceleration sensor detecting the tilting information.

21. The globe display device of claim 1, wherein the control unit is configured to control an on-state or off state of the display unit based on an angular velocity of the display unit.

* * * * *